United States Patent
Rajasekar et al.

(10) Patent No.: US 8,788,601 B2
(45) Date of Patent: Jul. 22, 2014

(54) RAPID NOTIFICATION SYSTEM

(75) Inventors: Anand Rajasekar, San Jose, CA (US); Pankaj Nayal, Delhi (IN)

(73) Assignee: Stratify, Inc., Mountain View, CA (US)

( * ) Notice: Subject to any disclaimer, the term of this patent is extended or adjusted under 35 U.S.C. 154(b) by 288 days.

(21) Appl. No.: 13/116,330

(22) Filed: May 26, 2011

(65) Prior Publication Data

US 2012/0303720 A1    Nov. 29, 2012

(51) Int. Cl.
G06F 15/16 (2006.01)
G06F 9/50 (2006.01)
G06F 9/48 (2006.01)

(52) U.S. Cl.
CPC ............ *G06F 9/5027* (2013.01); *G06F 9/4843* (2013.01)
USPC ........................................................ 709/206

(58) Field of Classification Search
USPC .................. 370/411; 709/206, 207, 225, 227; 718/100, 103; 719/314
See application file for complete search history.

(56) References Cited

U.S. PATENT DOCUMENTS

| | | | | |
|---|---|---|---|---|
| 5,367,681 A * | 11/1994 | Foss et al. | ...................... | 719/314 |
| 5,923,826 A * | 7/1999 | Grzenda et al. | ............... | 358/1.15 |
| 6,466,326 B1 * | 10/2002 | Shima | .......................... | 358/1.12 |
| 6,662,203 B1 * | 12/2003 | Kling et al. | .................... | 718/103 |
| 7,769,722 B1 * | 8/2010 | Bergant et al. | ................. | 707/681 |
| 8,112,751 B2 * | 2/2012 | Leijen et al. | .................... | 718/100 |
| 2002/0089688 A1 * | 7/2002 | Ferlitsch et al. | .............. | 358/1.15 |
| 2003/0037091 A1 * | 2/2003 | Nishimura et al. | ........... | 709/103 |
| 2003/0133464 A1 * | 7/2003 | Marejka et al. | ................ | 370/411 |
| 2003/0227651 A1 * | 12/2003 | Mathieson | ..................... | 358/1.16 |
| 2005/0015768 A1 * | 1/2005 | Moore | ........................... | 718/102 |
| 2005/0267916 A1 * | 12/2005 | Tone et al. | ..................... | 707/200 |
| 2006/0004879 A1 * | 1/2006 | Tone | ............................ | 707/200 |
| 2008/0010350 A1 * | 1/2008 | Chen et al. | ..................... | 709/206 |
| 2008/0120620 A1 * | 5/2008 | Lett et al. | ....................... | 718/103 |
| 2009/0106323 A1 * | 4/2009 | Wong et al. | .................... | 707/201 |
| 2009/0150891 A1 * | 6/2009 | Matsa et al. | ................... | 718/103 |
| 2010/0269110 A1 * | 10/2010 | Leijen et al. | ................... | 718/100 |
| 2011/0061058 A1 * | 3/2011 | Nonogaki | ....................... | 718/104 |
| 2011/0185358 A1 * | 7/2011 | Ostrovsky et al. | ............. | 718/100 |
| 2012/0137092 A1 * | 5/2012 | Miyatake et al. | .............. | 711/162 |
| 2012/0226842 A1 * | 9/2012 | Evans et al. | .................... | 710/264 |

* cited by examiner

*Primary Examiner* — Chirag Shah
*Assistant Examiner* — Jael Ulysse

(57) ABSTRACT

Improved techniques of fulfilling a request to perform a task involve a master computer placing the request in a first queue and a copy of the request in a second queue, the second queue being frequently accessed by a set of worker computers which rapidly scans the second queue for requests to fulfill. If, during the scanning, a worker computer determines that it has a capability to fulfill the request, the worker computer removes the copy of the request from the second queue. Furthermore, if the copy of the request remains in the second queue after a brief time period, it is clear that the set of worker computers is unable to perform the task. In this case, the master computer takes a remedial action such as notifying a client computer which sent the request that the worker computers, as currently configured, are unable to perform the task.

20 Claims, 7 Drawing Sheets

RAPID NOTIFICATION SYSTEM

BACKGROUND

A typical electronic discovery ("eDiscovery") project may require a substantial amount of processing work. In eDiscovery projects, processing work originates from running specialized jobs such as performing keyword searches, analyzing correspondence for communication patterns, etc. A conventional system configured to process work from eDiscovery projects may include several secondary computers, each of which has capabilities to run particular types of specialized jobs. Such a conventional system also includes a main computer which (i) receives a command to perform processing work from a client and (ii) runs a scheduler which, in response to the receipt of the command, controls how the processing work is distributed to the computers.

One type of scheduler is an active scheduler which, upon receipt of a command to perform processing work, distributes the processing work directly to the secondary computers according to their capabilities. Another type of scheduler is a passive scheduler which places a command to perform processing work in a pool. When the main computer runs a passive scheduler, each secondary computer in the system performs processing work described in commands in the pool based on its capabilities, passing over processing work of which it is not capable.

Within the conventional system, when a secondary computer completes processing work, the main computer notifies the client that the processing work is completed.

SUMMARY

The above-described conventional system configured to process work for eDiscovery projects may have a large number of secondary computers which may vary in performance (e.g., speed, processing task capabilities, etc.). In such conventional systems, it is not practical to run an active scheduler on the main computer due to the complexity inherent in distributing processing work directly to the large number of secondary computers in an optimal manner.

Instead, the main computer of such a conventional system typically runs a passive scheduler. Because the main computer is not distributing processing work directly to the secondary computers, the conventional system relies on the assumption that the secondary computers will ultimately finish all of the processing work.

Unfortunately, there are deficiencies in the above-described conventional systems which run a passive scheduler. For example, such a conventional system may experience significant delays in notifying a client of an inability of the system to process work. Along these lines, suppose that a client sends, to the main computer, a command to process a set of documents in Korean. The main computer places the command into a storage location within an intermediary server accessible to the secondary computers, from which storage location a secondary computer is expected to take the request and process the work described in the request. It is possible, however, that no secondary computer in the system can process the set of documents, either due to static considerations (e.g., no Korean language support) or dynamic considerations (e.g., secondary computers in the conventional system that could perform the translation are in failure states). In such a case, the main computer would have no way of knowing that no secondary computer in the system was performing the translation until a time-out period had elapsed, a typical time-out period being between 8 and 24 hours as an eDiscovery job may have a large set of documents to process. In many eDiscovery projects, such a wait to find out that processing work will not be completed is highly undesirable.

In contrast to the above-described conventional systems configured to process work, improved techniques of fulfilling a request to perform a task involve a master computer placing the request in a first queue and a copy of the request in a second queue, the second queue being frequently accessed by a set of worker computers which rapidly scans the second queue for requests to fulfill. If during the scanning, a worker computer determines that it has a capability to fulfill the request, the worker computer removes the copy of the request from the second queue. Furthermore, if the copy of the request remains in the second queue after a brief time period, it is clear that the set of worker computers is unable to perform the task. In this case, the master computer takes a remedial action such as notifying a client computer which sent the request that the worker computers, as currently configured, are unable to perform the task.

One embodiment of the improved techniques is directed to a method of fulfilling a request to perform a task. The method includes placing the request in a first queue and placing a copy of the request in a second queue. The method also includes monitoring progress of the performance of the task if the copy of the request is not found in the second queue after a second wait period which is smaller than the first wait period. The method further includes sending a message to the client computer if the copy of the request is found in the second queue after the second wait period, the message informing a client computer that the set of worker computers is currently unable to perform the task within the first wait period.

Additionally, some embodiments of the improved technique are directed to a system configured to fulfill a request to perform a task. The system includes a master computer having a network interface, a memory and a processor coupled to the memory, the processor configured to carry out the method of fulfilling a request to perform a task.

Furthermore, some embodiments of the improved technique are directed to a computer program product having a non-transitory computer readable storage medium which stores code including a set of instructions to carry out the method of fulfilling a request to perform a task.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 2(*b*) is a schematic diagram of a worker computer for use in the electronic environment of FIG. 1.

FIG. 2(*c*) is a schematic diagram of a queue manager for use in the electronic environment of FIG. 1.

DETAILED DESCRIPTION

Improved techniques of fulfilling a request to perform a task involve a master computer placing the request in a first queue and a copy of the request in a second queue, the second queue being frequently accessed by a set of worker computers which rapidly scans the second queue for requests to fulfill. If during the scanning, a worker computer determines that it has a capability to fulfill the request, the worker computer removes the copy of the request from the second queue. Furthermore, if the copy of the request remains in the second queue after a brief time period, it is clear that the set of worker computers is unable to perform the task. In this case, the master computer takes a remedial action such as notifying a client computer which sent the request that the worker computers, as currently configured, are unable to perform the task.

It should be understood that the much longer time period mentioned above with reference to the improved techniques can be several orders of magnitude longer than the pre-determined, brief time period. As an illustration, a much longer time period defined by events in the master computer such a system time-out period can be about 24 hours as an eDiscovery job may involve processing large amounts of data. On the other hand, the pre-determined, brief time period is defined by a time in which each worker computer is expected to have scanned the second queue. If each worker computer scans the second queue using low-priority threads which can be dedicated to the scanning, this brief time period can be as short as a fraction of a second.

Figure 1:
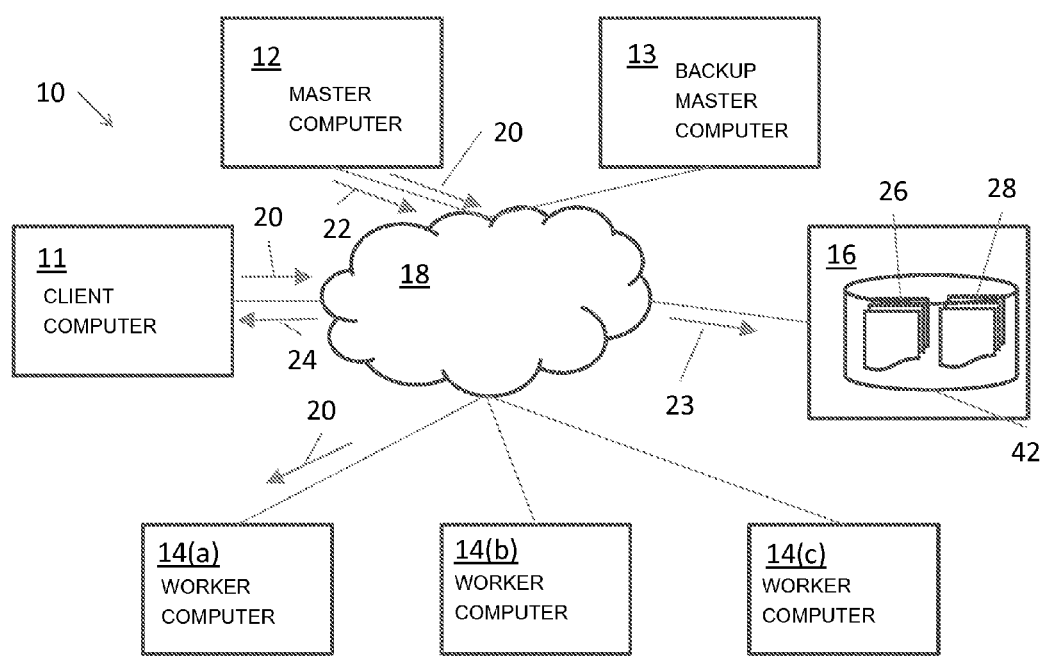
FIG. 1 is a schematic diagram of an electronic environment configured to carry out the improved technique.

FIG. 1 shows an electronic environment 10 which is suitable for use by the improved techniques. Electronic environment 10 include client computer 11, master computer 12, worker computers 14(a), 14(b) and 14(c) (worker computers 14), queue manager 16 and communication medium 18. In some arrangements, electronic environment 10 further includes a backup master computer 13 which is constructed and arranged to perform the functions of master computer 12 in the event of a failure of master computer 12.

Communication medium 18 provides connections between master computer 12, queue manager 16 and worker computers 14. The communications medium 12 may implement a variety of protocols such as TCP/IP, UDP, ATM, Ethernet, Fibre Channel, combinations thereof, and the like. Furthermore, the communications medium 18 may include various components (e.g., cables, switches, gateways/bridges, NAS/SAN appliances/nodes, interfaces, etc.). Moreover, the communications medium 18 is capable of having a variety of topologies (e.g., queue manager-and-spoke, ring, backbone, multi-drop, point-to-point, irregular, combinations thereof, and so on).

Master computer 12 is constructed and arranged to receive requests 20 to perform tasks from client computer 11 over communications medium 18. Master computer 12 is also constructed and arranged to run a passive scheduler, placing requests 20 in a work queue 26 and copies 22 of requests 20 in a test queue 28, further examining test queue 28 at periodic intervals each of which are smaller than a system time-out period. Master computer 12 is further constructed and arranged to send messages 24 to client computer 11 over communications medium 18 concerning whether or not the tasks can be performed within the system time-out period.

Master computer 12 is also constructed and arranged to monitor the progress of tasks which worker computers 14 are performing.

It should be understood that tasks can take the form of any processing activity including, for example, in the context of eDiscovery, processing of text in a foreign language, searching a set of documents for keyword pairs, etc.

Queue manager 16 is constructed and arranged to run software which manages work queue 26 and test queue 28. Queue manager 16 includes a memory 42 to store items in work queue 26 and test queue 28.

Worker computers 14 are each constructed and arranged to perform particular tasks corresponding to requests in work queue 26. Worker computers 14 are each further constructed and arranged to read copies 22 of requests 20 on second queue 28 and delete copies 22 of requests 20 if the worker computer 14 is able to perform the tasks corresponding to requests 20.

It should be understood that each worker computer 14 is capable of performing particular tasks depending on its configuration details. Configuration details which determine which particular tasks a worker computer 14 can complete include, for example, processor speed, number of cores and threads in each core, amount of memory, software loaded, etc. It should also be understood that, although a worker computer 14 is constructed and arranged to perform particular tasks, worker computer 14 might not be able to perform the particular task for reasons including a lack of capacity, a software failure, a hardware failure, etc. That is, dynamic considerations as well as static considerations determine whether each worker computer 14 is capable of completing a task.

During operation, upon receiving a request 20 from client 11 to perform a task, master computer 12 makes a copy 22 of request 20 and sends request 20 and copy 22 to queue manager 16. Queue manager 16 places request 20 to perform the task into work queue 26 and places copy 22 into test queue 28. In the meantime, worker computers 14 each scan test queue 28 at frequent intervals which are smaller than a periodic interval at which master computer 12 examines test queue 28. During such scanning, if a worker computer 14 has capability to perform the task now or in the future, then the worker computer 14 removes the copy 22 of the request 20 to perform the task from test queue 28. On the other hand, if the worker computer 14 does not have the capability to perform the task, then worker computer 14 leaves the copy 22 of the request 20 to perform the task in test queue 28. After a time equal to a predetermined scan interval, master computer 12 scans test queue 28 for the copy 22 of the request 20 to perform the task. If master computer 12 finds, in the scanning, the copy 22 of the request 20 in test queue 28, then master computer 12 sends a message to client 11 stating that no worker computer 14 will perform the task within a system time-out period. If on the other hand, master computer 12 does not find the copy 22 of the request 20 in test queue 28, then master computer 12 begins monitoring the progress of the task.

An advantage of establishing test queue 28 and managing it in the manner described above is that client 11 is notified within seconds, rather than hours or even days, if no worker computer 14 is able to perform the task which the client requested. Because the worker computers 14 scan the second queue 28 and remove copies 22 of requests 20 corresponding to tasks which the worker computers 14 could perform, master computer 12 now knows if a worker computer 14 can perform a particular task. Client computer 11 then only waits as little as a few seconds or less, as opposed to 24 hours or more, before finding out that the particular task could not be performed and the master server not knowing any capabilities of the workers.

Figure 2A:
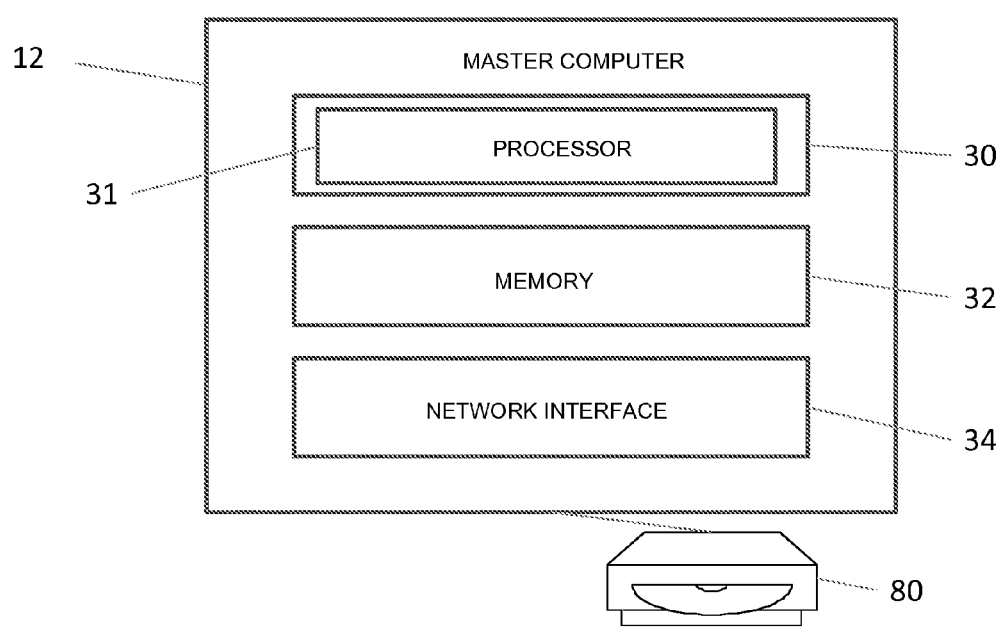
FIG. 2(*a*) is a schematic diagram of a master computer for use in the electronic environment of FIG. 1.

Additional details of how master computer 12 fulfills a request to perform a task will be explained with regard to FIGS. 2(*a*), 2(*b*), 2(*c*) and 3.

Figure 2B:
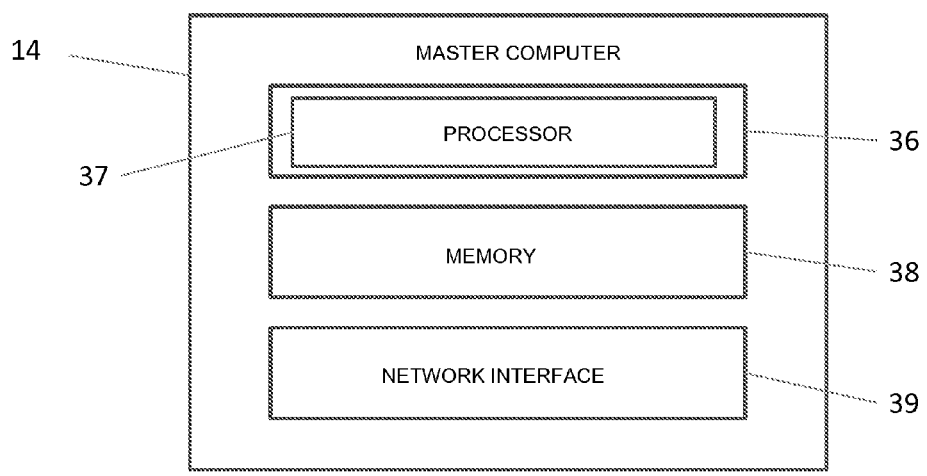
Figure 2C:
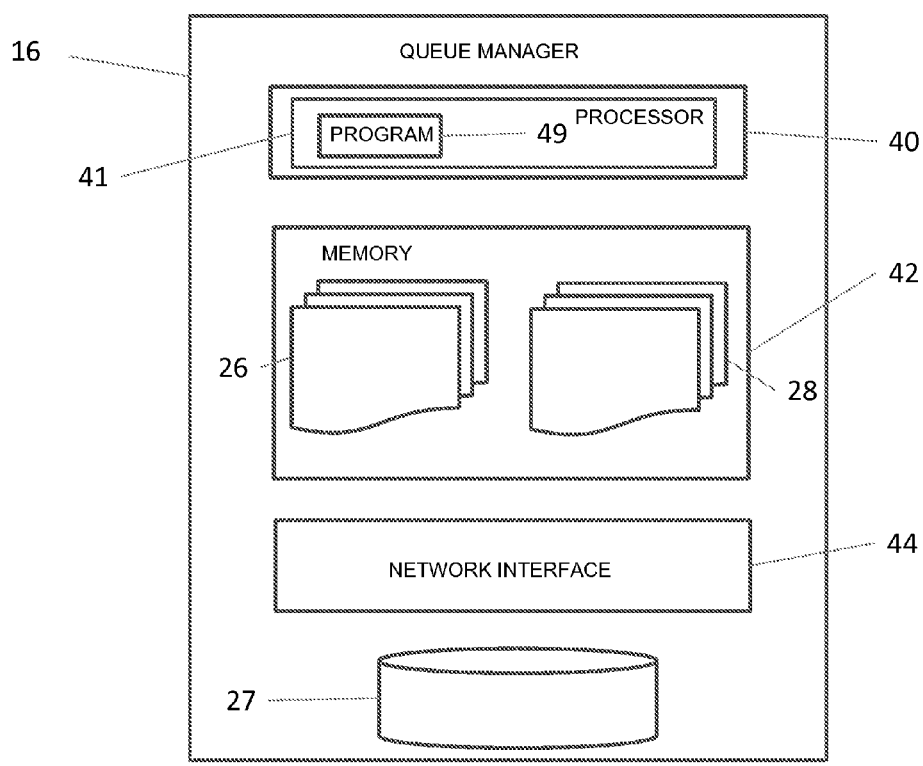

FIG. 2(*a*) shows further detail of master computer 12. Master computer 12 includes a controller 30 which in turn includes processor 31. Master computer 12 also includes memory 32 and network interface 34.

Memory 32 is configured to store a computer program 80 which is constructed and arranged to fulfill a request to perform a task. Memory 32 generally takes the form of e.g., random access memory, flash memory or a non-volatile memory.

Processor 31 can take the form of but is not limited to, an Intel or AMD-based MPU, and can be a single or multi-core running single or multiple threads. Processor 31 is coupled to memory 32 and is configured to execute the computer program 80 stored in memory 32. In addition, processor 31 is constructed and arranged to perform copy operations.

Network interface 34 is constructed and arranged to send and receive data over communications medium 18. Specifically, network interface 34 is configured to receive requests 20 from and send messages to client 11 and send data to and receive data from queue manager 16.

FIG. 2(*b*) shows further detail of a worker computer 14. Worker computer 14 includes a controller 36 which in turn includes processor 37. Worker computer 14 also includes memory 38 and network interface 39.

Memory 38 is configured to store a computer program which is constructed and arranged to perform a task. Memory 38 generally takes the form of e.g., random access memory, flash memory or a non-volatile memory.

Processor 37 can take the form of but is not limited to, an Intel or AMD-based MPU, and can be a single or multi-core running single or multiple threads. Processor 37 is coupled to memory 38 and is configured to execute the computer program stored in memory 38.

Network interface 39 is constructed and arranged to send and receive data over communications medium 18. Specifically, network interface 39 is configured to send data to and receive data from queue manager 16.

FIG. 2(*c*) shows further detail of queue manager 16. Queue Manager 16 includes a controller 40 which in turn includes processor 41. Queue Manager 16 also includes memory 42, network interface 44 and persistent storage medium 27.

Memory 42 is configured to store a computer program 49 which is constructed and arranged to manage queues 26 and 28. Computer program 49 takes on any of various forms including a message broker such as Apache ActiveMQ (The Apache Software Foundation). Memory 42 generally takes the form of e.g., random access memory, flash memory or a non-volatile memory.

Processor 41 can take the form of but is not limited to, an Intel or AMD-based MPU (Intel Corp., Santa Clara, Calif.; and Advanced Micro Devices, Inc., Sunnyvale, Calif., respectively), and can be a single or multi-core running single or multiple threads. Processor 41 is coupled to memory 42 and is configured to execute the computer program 49 stored in memory 42.

Network interface 44 is constructed and arranged to send and receive data over communications medium 18. Specifically, network interface 44 is configured to send data to and receive data from worker computers 14 and master computer 12.

Persistent storage medium 27 is constructed and arranged to store details of tasks obtained from master computer 12.

Figure 3:
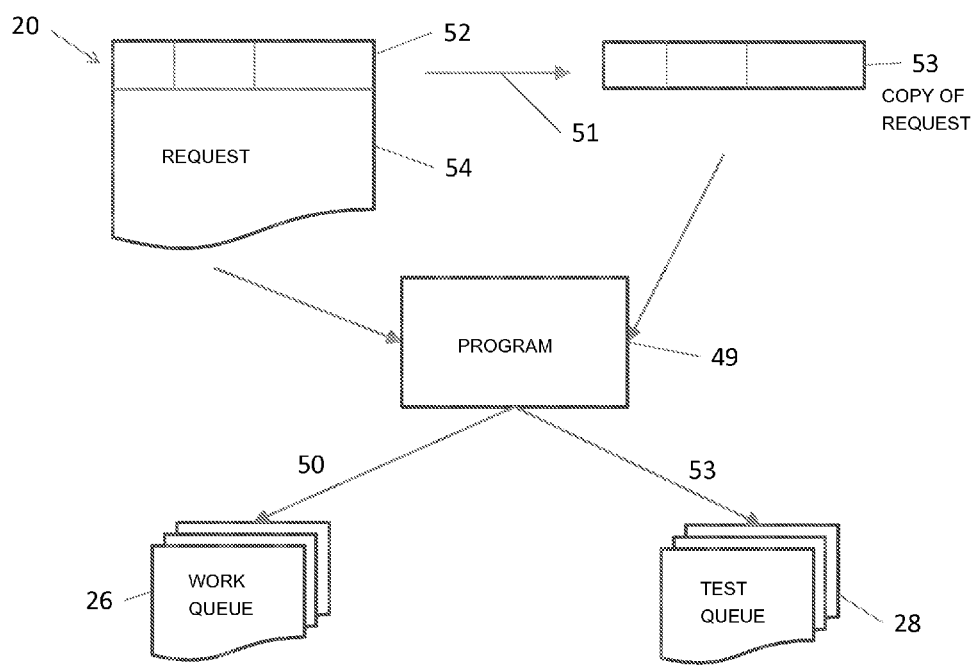
FIG. 3 is a schematic diagram which illustrates the interaction between the master computer, the queue manager and queues managed by the queue manager.

FIG. 3 shows further detail of a request to perform a task 20. Request 20 includes header 52 and payload 54.

Header 52 is configured to store metadata concerning the task, examples of which include a task identifier, a priority level for the task, etc.

Payload 54 is configured to provide data sufficient for a worker computer 14 to perform the task. As an example, payload 54 contains pointers to a location in a storage medium in which documents to be translated are stored.

In some arrangements, master computer 12, upon receiving request 20 from client 11 (see FIG. 1) via network interface 34, performs, via processor 31 (see FIG. 2(*a*)), a copy operation 51 on request 20 to generate a copy 53 of header 52, both request 20 and copy 53 being stored in memory 32. Master computer 12 then places, via network interface 34, request 20 in work queue 26 which is stored in a location in memory 42 and copy 53 in test queue 28 which is stored in another location in memory 42 to queue manager 16.

In some further arrangements, computer program 80 generates instructions to processor 31 to execute a scan procedure 23 (see FIG. 1) on test queue 28. Scan procedure 23 is constructed and arranged to locate copy 53 of header 52 within test queue 28. Details of the contents of header 52 are available to master computer 12 by its storing the contents of the header in persistent storage medium 27. If scan procedure 23 returns a pointer to the location of the copy 53 within test queue 28, computer program 80 generates instructions for processor 31 to send a message to client 11 (see FIG. 1) which states that the task associated with request 20 will not be performed within the system time-out period. If on the other hand, scan procedure 23 returns an empty result signifying that copy 53 is not in test queue 28, computer program 80 generates instructions for processor 31 to monitor progress of the task associated with request 20.

It should be understood that processor 37 of worker computer 14 schedules processes which run low-priority threads and high-priority threads. Using the low-priority threads allows worker computer 14 to scan test queue 28 as an essentially background process and frees the high-priority threads for task performance activities.

As mentioned above, in some cases scan procedure 23 returns a pointer to a location within test queue 28 where copy 53 is located. Further, copy 53 and header 52, in some arrangements, contain a priority level corresponding to the task associated with request 20. In some further arrangements, the location depends on the priority level in the header 52 and test queue 28 is a priority queue, as will be described in further detail with regard to FIG. 4.

Figure 4:
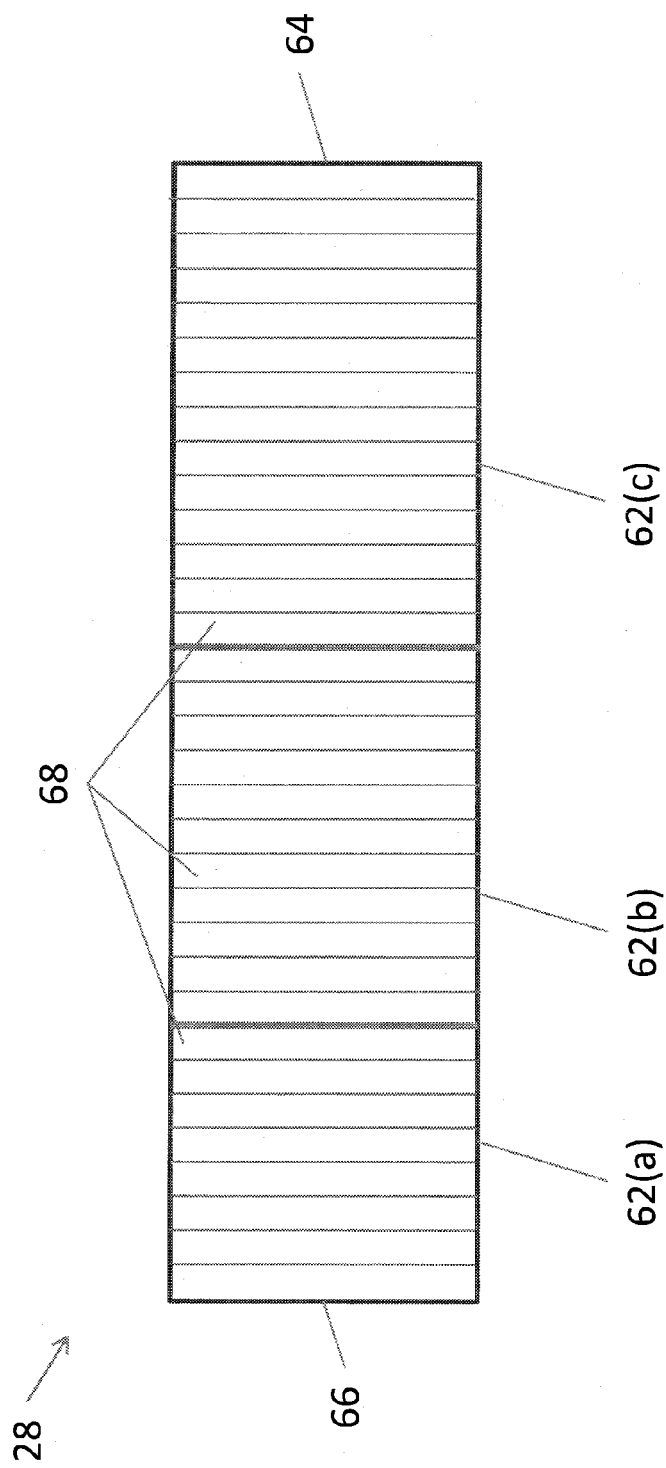
FIG. 4 is a schematic diagram which illustrates the structure of a queue.

FIG. 4 shows a particular test queue 28 which is configured as a priority queue. That is, elements 68 of test queue 28 which are closer to the front 64 of queue 28 have a higher priority than elements 68 which are closer to the back 66 of test queue 28. That is, if a priority level in copy 53 of header 52 is greater than the priority level of the element 68 at the front 64 of test queue 28, then queue management software 49 provides instructions to processor 41 to move element 68 to another location within test queue 28 and to place copy 53 at the front 64 of test queue 28.

In some arrangements, location of elements 68 within test queue 28 is further determined by a type of task as specified in header 52. Types of tasks include translation tasks, metadata tasks, searching tasks, etc. Within test queue 28, elements 68 are grouped by task types, resulting in elements groups 62(*a*), 62(*b*) and 62(*c*) (element groups 62). In such arrangements, copy 53 is placed in a location in test queue 28 corresponding to the position within a group 62 closest to the back 66 of test queue 28. An advantage of placing copy 53 within second queue 28 in this manner lies in the maintenance of task priority which helps to ensure a greater chance of a worker computer being able to complete a higher priority task.

In some further arrangements, request 20 corresponds to a task which is to be split into smaller tasks for parallelization across worker computers 14. In such arrangements, computer program 80 generates instructions for processor 31 to split request 20 into multiple requests each corresponding to a sub-task. Processor 31 then generates a header for each of the multiple requests containing metadata describing the subtask to which the request is associated. Processor 31 then makes a copy of each of the headers of the multiple requests and sends the requests and the copies of the headers to queue manager 16. Queue manager 16 places each of the multiple requests in work queue 26 and places each of the copies of the headers in test queue 28. Each of the subtasks has an identical priority level and corresponds to the same original task; processor 41 then places the copies of the headers in the same group 62 within test queue 28.

In some further arrangements, a task corresponding to request 20 is characterized by a state, examples of which include waiting for acquisition, acquired, 50% complete, complete, failure, etc. A worker computer 14 which performs the task periodically outputs the state of the task into a location in memory 42 of queue manager 16 which is accessible to master computer 12, the location in memory specified in a field in header 52. Master computer 12 monitors a performance of the task by reading the state of the task.

If the state of the task is a failure, then master computer 12 places the request 20 corresponding to the task in the work queue 26 and the copy 22 of the request 20 in the test queue 28. Again, worker computers 14 each scan test queue 28 at frequent intervals which are smaller than a periodic interval at which master computer 12 examines test queue 28. If a worker computer 14 has capability to perform the task, then the worker computer 14 removes the copy 22 of the request 20 to perform the translation from test queue 28. On the other hand, if the worker computer 14 does not have the capability to perform the task, then worker computer 14 leaves the copy 22 of the request 20 to perform the task in test queue 28. After a time about equal to a periodic interval, master computer 12 scans test queue 28 for the copy 22 of the request 20 to perform the task. If master computer 12 finds, in the scanning, the copy 22 of the request 20 in test queue 28, then master computer 12 sends a message to client 11 stating that the task has failed to perform.

Some further arrangements have a high availability for master computer 12. In this regard, backup master computer 13 (see FIG. 1) is included in electronic environment 10. Backup master computer 13 includes a controller 30 which in turn includes processor 31. Master computer 12 also includes memory 32 and network interface 34.

As master computer 12 reads the state of the task, master computer 12 sends a signal to queue manager 16 acknowledging the reading of the state of the task. For example, a storing of the state of the task in a persistent storage medium 27 (see FIG. 2(c)) within queue manager 16 represents an acknowledgement of the reading of the state. If queue manager 16 fails to receive an acknowledgment from master computer 12 after a particular time period, queue manager 16 sends a signal to backup master computer 13 instructing processor 31 of backup master computer 13 to read the state of the task from the persistent storage 27 and take action accordingly.

Figure 5:
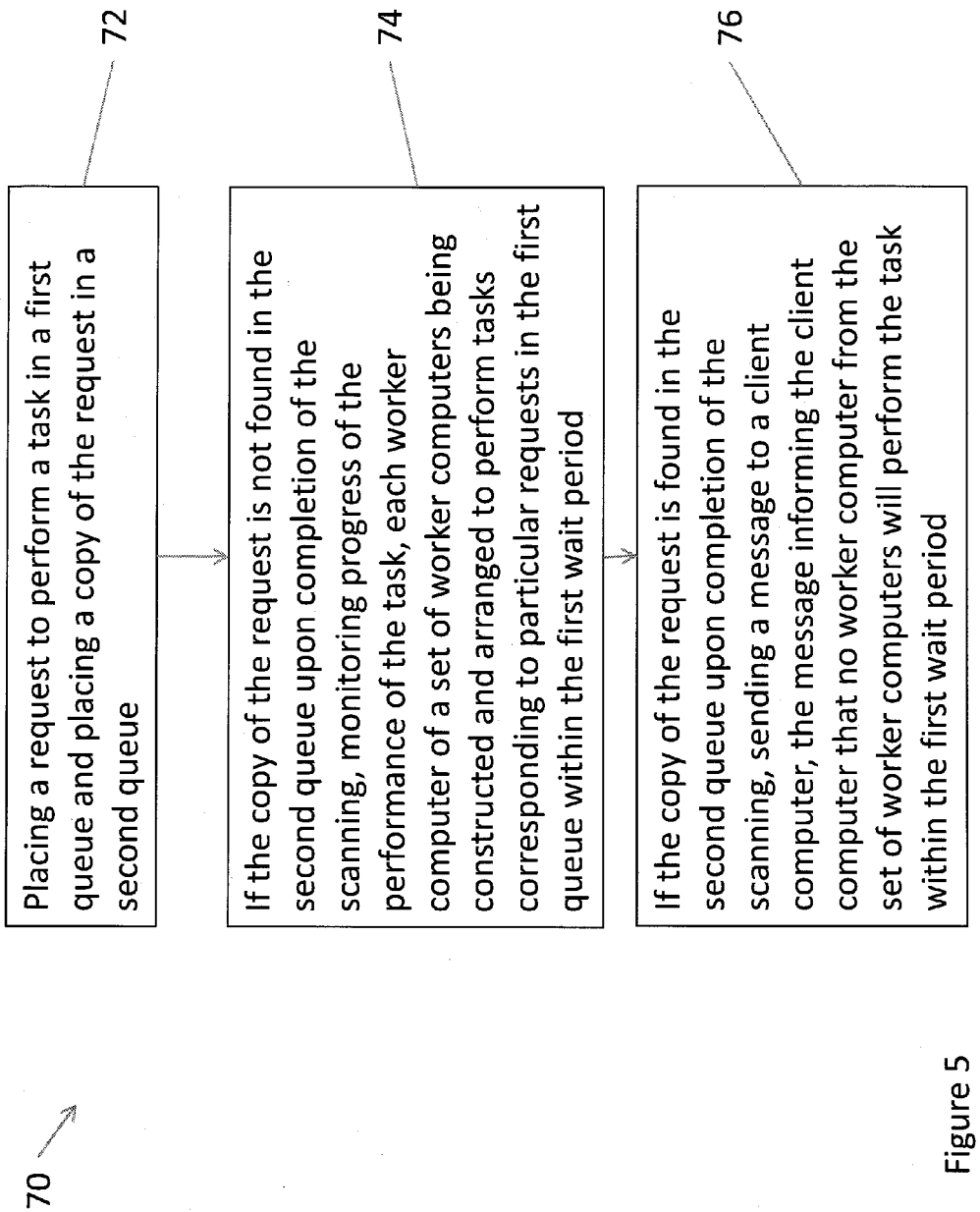
FIG. 5 is a flow chart which illustrates a method of carrying out the improved technique within the electronic environment of FIG. 1.

FIG. 5 illustrates a method 70 of fulfilling a request to perform a task. In step 72, the request is placed in the first queue and a copy of the request is placed in a second queue. In step 74, progress of the performance of the task is monitored if the copy of the request is not found in the second queue after a second wait period which is smaller than a first wait period, each worker computer of a set of worker computers being constructed and arranged to perform tasks corresponding to particular requests in the first queue within the first wait period. In step 76, a message is sent to the client computer, the message informing a client computer that no worker computer from the set of worker computers will perform the task within the first wait period if the copy of the request is found in the second queue after the second wait period.

While various embodiments of the invention have been particularly shown and described, it will be understood by those skilled in the art that various changes in form and details may be made therein without departing from the spirit and scope of the invention as defined by the appended claims.

For example, it should be understood that more than one backup master computer 13 can be made available to electronic environment 10.

Also, it should be understood that, while the first queue 26 and the second queue 28 are located in storage on queue manager 16 which is depicted in FIG. 1 as being apart from master computer 12. In some arrangements, however, queue manager 16 is located within master computer 12.

Further, it should be understood that a worker computer 14 which performs the task can periodically output the state of the task into any memory location which is accessible to master computer 12, including in memory 32 within master computer 12.

Further, it should be understood that the predetermined scan interval can be any amount of time which is significantly less than a typical time-out period of say, 24 hours. For example, the predetermined scan interval can be shorter than 5 seconds, say 1 second, 0.1 seconds, etc. The predetermined scan interval can also be longer than 5 seconds, for example, 10 seconds, 1 minute, 10 minutes, etc.

Furthermore, it should be understood that some embodiments are directed to master computer 12 which fulfills a request to perform a task. Some embodiments are directed to master computer 12. Some embodiments are directed to a system which fulfills a request to perform a task. Some embodiments are directed to a process of fulfilling a request to perform a task. Also, some embodiments are directed to a computer program product which enables computer logic to perform the fulfilling of a request to perform a task.

In some arrangements, master computer 12 is implemented by a set of processors or other types of control/processing circuitry running software. In such arrangements, the software instructions can be delivered to master computer 12 in the form of a computer program product (illustrated generally by code for computer program 80 stored within memory 32 in FIG. 2(a)) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:
1. A method of fulfilling a request to perform a task, the method comprising:
receiving the request from a client computer, wherein the received request is made available to a set of worker computers, each worker computer performing tasks corresponding to particular requests in a first queue within a first wait period;

placing the received request in the first queue and placing a copy of the received request in a second queue by a queue manager, the second queue to be scanned by each worker computer at plural intervals, a copy of a given request to be removed from the second queue by a given worker computer if the given worker computer is able to perform the given request, and the copy of the given request to be left in the second queue if the given worker computer is unable to perform the given request;

performing a scan of the second queue by a master computer; and wherein in response to not finding the copy of the received request in the second queue after a second wait period which is smaller than the first wait period, the master computer beginning monitoring progress of a performance of the task by reading a state of the task.

2. A method as in claim 1, wherein the received request includes a header, wherein the header includes fields which describe the task corresponding to the received request; and
wherein placing the received request in the first queue and placing the copy of the received request in the second queue includes:
placing, as the copy of the received request, a copy of the header of the received request in the second queue.

3. A method as in claim 2, wherein the header includes a field denoting a priority level associated with the task corresponding to the received request;
wherein the first queue and the second queue are each a priority queue;
wherein placing the copy of the header of the received request in the second queue includes:
placing the copy of the header of the received request into a location of the second queue which is based on the priority level associated with the task corresponding to the received request; and
wherein placing the received request in the first queue includes:
placing the received request in a location in the first queue corresponding to the location of the second queue into which the copy of the header of the received request was placed.

4. A method as in claim 3, wherein the priority level of the task is based on a type associated with the task;
wherein placing the copy of the header of the received request into the location of the second queue which is based on the priority level associated with the task corresponding to the received request includes:
placing the copy of the header of the received request at a last position within a grouping of copies of headers of tasks with which the type is associated in the second queue.

5. A method as in claim 2, wherein the first queue and the second queue are managed by a message broker; and wherein placing the received request in the first queue further includes:
sending the received request to the message broker, the message broker placing the received request in the first queue; and
wherein placing the copy of the header of the received request in the second queue includes:
upon receipt of the received request from the client computer, generating the copy of the header of the received request; and
sending, to the message broker, the copy of the header of the received request, the message broker placing the copy of the header of the received request in the second queue;

wherein the method further comprises:
splitting the task corresponding to the received request into a set of smaller tasks; generating, from the header of the received request, a header for each smaller task of the set of smaller tasks;
wherein sending, to the message broker, the copy of the header of the received request includes:
for each smaller task of the set of smaller tasks:
sending, to the message broker, a copy of the header of the smaller task, the message broker placing the copy of the header of the smaller task in the second queue.

6. A method as in claim 2, further comprising:
executing a scan procedure, the scan procedure constructed and arranged to locate the header of the received request within the second queue.

7. A method as in claim 1, further comprising:
in response to finding the copy of the received request in the second queue after the second wait period, sending a message to the client computer informing the client computer that the set of worker computers is currently unable to perform the task within the first wait period.

8. A system configured to fulfill a request to perform a task, the system comprising:
a master computer comprising:
a memory;
a controller including controlling circuitry coupled to the memory; and
a network interface to communicate with a set of worker computers, each to perform tasks corresponding to particular requests in a first queue within a first wait period;
wherein the controlling circuitry is configured to:
receive the request from a client computer;
cause a queue manager to place the received request in the first queue and a copy of the received request in a second queue, the second queue to be scanned by each worker computer at plural intervals, a copy of a given request to be removed from the second queue by a given worker computer if the given worker computer is able to perform the given request, and the copy of the given request to be left in the second queue if the given worker computer is unable to perform the given request;
perform a scan of the second queue; and
wherein in response to not finding the copy of the received request in the second queue after a second wait period which is smaller than the first wait period, begin monitoring progress of a performance of the task by reading a state of the task.

9. A system as in claim 8, further comprising the queue manager separate from the master computer;
wherein the queue manager includes a network interface; and
wherein placing the received request in the first queue and the copy of the received request in the second queue includes:
sending, by the network interface of the master computer, the received request and the copy of the received request to the queue manager; and
receiving, by the network interface of the queue manager, the received request and the copy of the received request.

10. A system as in claim 9, wherein the received request includes a header, wherein the header includes fields which describe the task to be performed; and
wherein placing the received request in the first queue and placing the copy of the received request in the second queue includes:
placing, as the copy of the received request, a copy of the header of the received request in the second queue.

11. A system as in claim 10, wherein the header includes a field denoting a priority level associated with the task corresponding to the received request;
   wherein the first queue and the second queue are each a priority queue;
   wherein placing the copy of the header of the received request in the second queue includes:
   placing the copy of the header of the received request into a location of the second queue which is based on the priority level associated with the task corresponding to the received request; and
   wherein placing the received request in the first queue includes:
   placing the received request in a location in the first queue corresponding to the location of the second queue into which the copy of the header of the received request was placed.

12. A system as in claim 11, wherein the priority level of the task is based on a type associated with the task;
   wherein placing the copy of the header of the received request into the location of the second queue which is based on the priority level associated with the task corresponding to the received request includes:
   placing the copy of the header of the received request at a last position within a grouping of copies of headers of tasks with which the type is associated in the second queue.

13. A system as in claim 10, wherein the queue manager is configured to execute a message broker which is configured to manage the first queue and the second queue; and
   wherein placing the received request in the first queue further includes:
   sending the received request to the message broker, the message broker placing the received request in the first queue; and
   wherein placing the copy of the header of the received request in the second queue includes:
   upon receipt of the received request from the client computer, generating the copy of the header of the received request; and sending, to the message broker, the copy of the header of the received request, the message broker placing the copy of the header of the received request in the second queue;
   wherein the controlling circuitry of the master computer is further configured to: split the task corresponding to the received request into a set of smaller tasks;
   generate, from the header of the received request, a header for each smaller task of the set of smaller tasks;
   wherein sending, to the message broker, the copy of the header of the received request includes:
   for each smaller task of the set of smaller tasks:
   sending, to the message broker, a copy of the header of the smaller task, the message broker placing the copy of the header of the smaller task in the second queue.

14. A system as in claim 13, wherein tasks to be performed according to their corresponding requests in the first queue are characterized by a state;
   wherein the fields of the header of the received request include a work area field, the work area field including a pointer to a space in a memory where worker computers from the set of worker computers store states of tasks corresponding to requests in the first queue,
   wherein the controlling circuitry of the master computer is further configured to:
   if a current state of the task is a failure state:
   send, to the message broker, the received request and the copy of the header of the received request to which the task corresponds, the message broker placing the received request in the first queue and the copy of the header of the received request in the second queue; and
   if the copy of the header of the received request is not in the second queue after the second wait period, monitor progress of the performance of the task; and
   if the copy of the header of the received request is in the second queue after the second wait period, send a message to the client computer, the message informing the client computer of the failure to perform the task; and
   if the current state of the task is not a failure state:
   monitor progress of the performance of the task.

15. A system as in claim 13, further comprising:
   a standby master computer, the standby master computer including:
   a memory;
   a controller which includes controlling circuitry coupled to the memory; and
   a network interface;
   wherein a persistent journal, located in the memory of the queue manager, stores states of the particular tasks sent to the message broker by the master computer and performed upon by a worker computer of the set of worker computer; and
   wherein if the controlling circuitry of the master computer fails to read the state of the task, the controlling circuitry of the standby master computer is configured to read the state of the task in the persistent journal.

16. A system as in claim 8, wherein the controlling circuitry is configured to further:
   in response to finding the copy of the received request in the second queue after the second wait period, notify, via the network interface of the master computer, the client computer that the set of worker computers is currently unable to perform the task within the first wait period.

17. A non-transitory computer readable storage medium which stores code executable by a master computer to:
   receive a request to perform a task from a client computer, the received request being made available to a set of worker computers, each worker computer of the set of worker computers to perform tasks corresponding to particular requests from a first queue within a first wait period;
   cause a queue manager to place the received request in the first queue and place a copy of the received request in a second queue, the second queue to be scanned by each worker computer at plural intervals, a copy of a given request to be removed from the second queue by a given worker computer if the given worker computer is able to perform the given request, and the copy of the given request to be left in the second queue if the given worker computer is unable to perform the given request;
   perform a scan of the second queue; and
   wherein in response to not finding the copy of the received request in the second queue after a second wait period that is smaller than the first wait period, begin monitoring progress of a performance of the task reading a state of the task.

18. A non-transitory computer readable storage medium as in claim 17, wherein the received request includes a header that includes fields which describe the task to be performed; and
   wherein placing the received request in the first queue and placing the copy of the received request in the second queue includes:
   placing, as the copy of the received request, a copy of the header of the received request in the second queue.

19. A non-transitory computer readable storage medium as in claim 18, wherein the header includes a field denoting a priority level associated with the task corresponding to the received request;
   wherein the first queue and the second queue are each a priority queue;
   wherein placing the copy of the header of the received request in the second queue includes:
   placing the copy of the header of the received request into a location of the second queue which is based on the priority level associated with the task corresponding to the received request; and
   wherein placing the received request in the first queue includes:
   placing the received request in a location in the first queue corresponding to the location of the second queue into which the copy of the header of the received request was placed.

20. A non-transitory computer readable storage medium as in claim 17, wherein the code is executable by the master computer to further:
   in response to finding the copy of the received request in the second queue after the second wait period, notify the client computer that the set of worker computers is currently unable to perform the task within the first wait period.

\* \* \* \* \*